Jan. 17, 1933. B. LUTSKY 1,894,407
VALVE FITTING FOR PLUMBING FIXTURES
Original Filed April 12, 1930   2 Sheets-Sheet 1
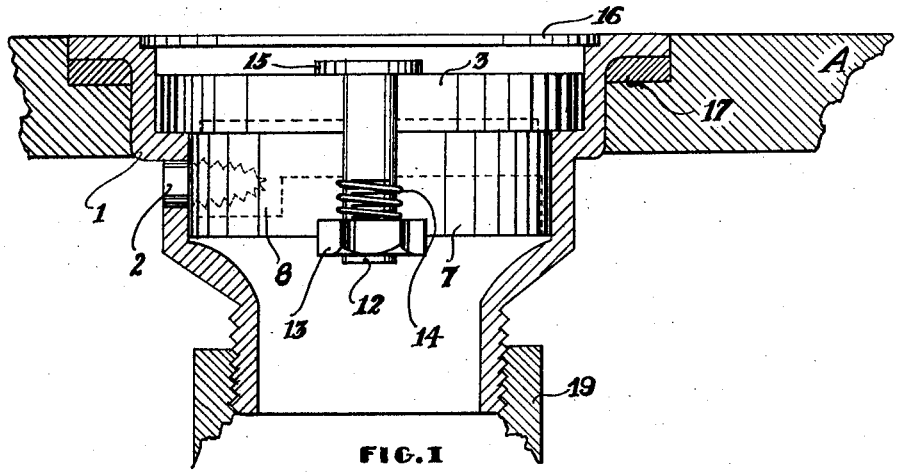
FIG. I
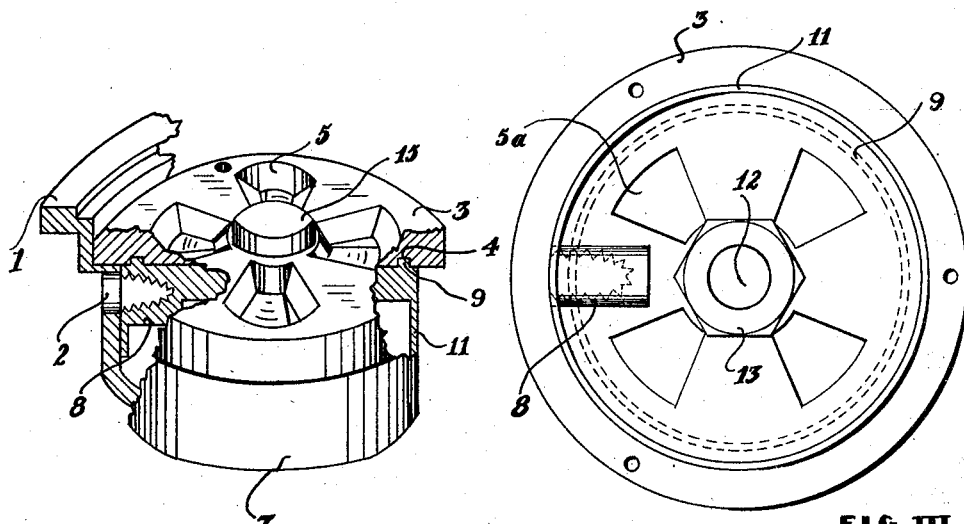
FIG. II
FIG. III
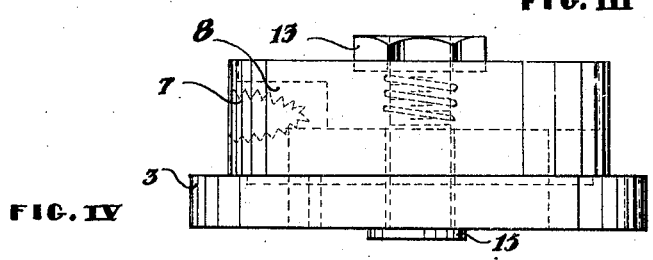
FIG. IV
BERNARD LUTSKY *INVENTOR.*
BY Alexander Mencher
ATTORNEY.

Jan. 17, 1933.   B. LUTSKY   1,894,407
VALVE FITTING FOR PLUMBING FIXTURES
Original Filed April 12, 1930   2 Sheets-Sheet 2
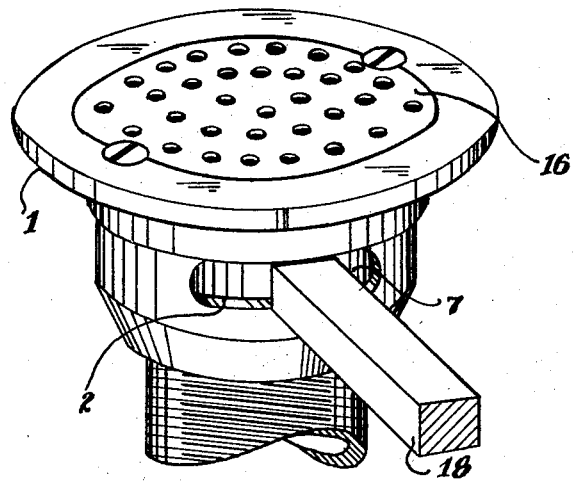
FIG. V
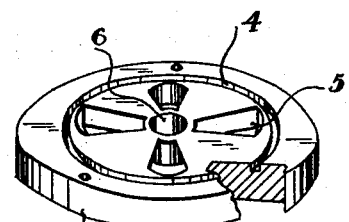
FIG. VII
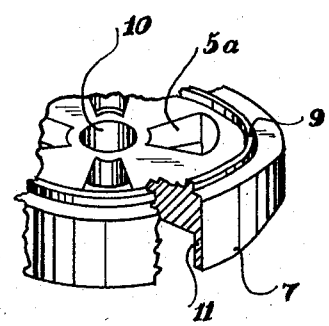
FIG. VI
BERNARD LUTSKY   INVENTOR.
BY *Alexander Mencher*
ATTORNEY.

Patented Jan. 17, 1933

1,894,407

UNITED STATES PATENT OFFICE

BERNARD LUTSKY, OF BROOKLYN, NEW YORK

VALVE FITTING FOR PLUMBING FIXTURES

Application filed April 12, 1930, Serial No. 443,849. Renewed June 10, 1932.

Generally, the invention relates to valve fittings adapted for communication from the outlet or port of a plumbing-fixture to the standard drain pipe. More particularly, the invention encompasses and relates to that type of fitting used in conjunction with kitchen sinks, basins, tubs and the like wherein the valve portion is operated manually and external to the bed of the particular receptacle in order to drain or stop the flow of water therethrough.

The primary object of the invention is the provision of a valve fitting furnished with valve elements operable external to the fixture to which the said fitting is associated and communicating directly to the usual or standard drain pipe, the casing element of the fitting being provided with a seat for a strainer which latter is coextensive with the bed of the receptacle or plumbing-fixture.

A further object of the invention is the provision of a valve fitting wherein the parts are constructed and assembled in a novel and unique manner so as to assure the positive opening and closing of the waste port by means of valve elements therebeneath without possibility of leakage therefrom or damage thereto from particles and other waste materials discarded into the kitchen sink, tub, basin or like receptacle. The fitting is made from a minimum number of parts, easy of assemblage, substantial in structure and economic to manufacture.

Another object of the invention is the provision for permanent affixation of the casing of the valve fitting to the port of the plumbing-fixture and to the terminal of the usual or standard drain pipe while the adjustable valve elements at the same time are easily accessible for purposes of repair and replacement.

These objects and other advantageous ends in the structure, arrangement and combination of parts to which my invention relates are now to be described, reference being had to the accompanying drawings wherein like reference characters designate corresponding parts throughout all the views.

Fig. I is a view of the valve fitting per se showing the casing in vertical section and the valve and bearing elements in elevation, the casing shown as installed.

Fig. II is a partial view in perspective being partly in section of Fig. I.

Fig. III is a plan view of the valve and bearing elements in inverted position and free of the casing.

Fig. IV is a view in elevation of Fig. III.

Fig. V is a view in perspective showing the valve fitting in operative position.

Fig. VI is a view in perspective partly in section showing the under element of the valve.

Fig. VII is a view in perspective partly in section showing the upper element of the valve in inverted position.

From the above set forth figures, 1 represents the casing of the valve fitting preferably made of brass, and comprises a channel limited by concentric walls of differential radii from the central and vertical axis thereof, the said channel terminating anteriorly in an outwardly turned and perpendicular annular flange, the same affording a concentric seat for a perforated disc 16 to serve as a strainer for the valve fitting. The upper surface of disc 16 is coextensive with the upper surface of the annular flange aforementioned. Progressing posteriorly, the radial difference between the first and second concentric walls affords a seat onto which valve elements of the fitting telescope. These elements are indicated by the numerals 3 and 7 and will be subsequently more fully described. The second concentric wall is reduced to a nipple as is best illustrated in Fig. I of the accompanying drawings and preferably externally threaded for connection with the terminal of the usual or standard drain pipe. Although not shown on Fig. I the seat onto which valve elements 3 and 7 telescope can be provided with a gasket to insure a fluid tight joint thereat for purposes hereinafter to be described. The second concentric wall of casing 1 is provided with a slot 2 as best illustrated in Fig. V.

Annular plate 3, being the upper element of the valve proper is provided with a central aperture and concentrically of the latter is a series of spaced radially disposed substantially segment shaped openings through which is adapted to flow water from the kitchen sink, basin, tub or other like receptacle to the drain or waste pipe. On the under side of plate 3 concentrically disposed and positioned beyond the outer perimeter of the segments is a groove preferably square in cross-section and designed to engage with a rib of the under element of the valve proper. The said groove is indicated by numeral 4 of the accompanying drawings.

7, being the under element of the valve proper is a right section of a cylindrical tube open at the bottom and provided with a top end of thickness preferably equivalent to annular plate 3. The said element 7 is of a lesser diameter than annular plate 3 with which it is concentric and is provided with a central aperture of the same diameter as the aperture of annular plate 3. These apertures of annular plate 3 and cylindrical tube 7 are indicated by the numerals 6 and 10 respectively of the accompanying drawings. Element 7 at the upper surface of the top end is provided with a concentric rib 9 preferably square in cross-section and situated to bear against annular groove 4. Moreover, element 7 at the top end is provided with a plurality of radially disposed segment shaped openings which are adapted to register with the openings in annular plate 3 when water is to be drained or let out of the particular plumbing-fixture to which my fitting is applied. The segments of annular plate 3 and element 7 are indicated by the numerals 5 and 5a respectively. On the under surface of the top end of element 7 and on a non-perforate portion is a burr 8 integral with the thickness of the top end of element 7, and is provided with a female screw that penetrates the wall of element 7 on one side and cul de sacs on the other side in the burr 8 and thickness of the top end of element 7. The foregoing is well illustrated in Fig. II of the accompanying drawings.

The top end of element 7 may be designated as the cut-off plate with respect to annular plate 3 by reason of the fact that the non-perforate portions thereof between the openings 5a are adapted to close the openings 5 of annular plate 3 in a manner to be subsequently described.

Passing through the apertures 6 and 10 of the valve elements 3 and 7 is a spindle 12 provided at its top with a cap 15 and threaded at its lower portion for engagement with a cap nut 13. 14 is a coil spring disposed above cap nut 13 and surrounding the threaded portion of spindle 12 for regulation of bearing tension between annular plate 3 and the upper surface of the cut-off plate of element 7. 18 is a lever provided with a male screw on one end and is passed through slot 2 of casing 1 in order to engage with the female screw of burr 8 and the cut-off plate of element 7. Slot 2 as best illustrated in Fig. V of the accompanying drawings is just large enough to give lever 18 that limited rotation which effects a complete closure or opening of segments 5 to the channel of the drain or waste pipe by means of the non-perforate or segment portions 5a of the cut-off plate of element 7.

The installation of the valve fitting comprising my invention is indeed a simple affair. The port or opening of the particular plumbing-fixture to which the fitting is applied is prepared in any way known to the art such as is illustrated in Fig. I wherein A represents the section of the bed of a fixture adapted to receive the flange of casing 1 and adapted to receive a gasket 17 to prevent possible leakage. Although not shown in Fig. I, the said flange is fixed to the bed of the fixture by any known means such as screw attachment. The nipple of casing 1 communicates with the channel of the drain or waste pipe by any known means such as a coupling designated in Fig. I by numeral 19.

The modus operandi of the valve fitting comprising my invention is as simple as the structure itself. Perforated disc 16, which is fastened to the seat provided on the inner edge of the flange of casing 1 by the usual means not deemed necessary to represent on the drawings, serves as a safeguard against the entry of solid and clogging material to both the bearing surfaces of the valve elements and the channel of the drain pipe. The under surface of annular plate 3 and the concentric groove 4 thereon serve as the plane bearing surfaces of the upper face and annular rib 9 of the cut-off plate respectively. Annular plate 3 is affixed by screw attachment to the seat upon which it rests the seat preferably being bedded with a gasket to avoid leakage along the inner casing wall. The affixation of annular plate 3 and the gasket above mentioned have not been represented on the accompanying drawings. Element 7 affording the cut-off plate is limitationally rotatable about annular plate 3 and spindle 12 the ease of rotation depending upon the extent to which locknut 12 is advanced. The tubular portion of element 7 designated by numeral 11 extends below slot 2 of casing 1 to prevent possible leakage thereout. The limited rotation of the cut-off plate is effected by the engagement of the female screw of burr 8 by the male screw termination of lever 18, the latter penetrating the same externally from casing 1 through slot 2 thereof, the width of the said slot 2 determining the juxtaposition of segments 5a or the non-perforate portions of the cut-off plate with segments 5 of annular plate 3 to open or close the valve proper. Lever 18 may project from the front wall of the fixture to which the fitting is applied enough to push it to the right or left by the person in charge for opening or closing the valve as shown in Fig. V, or the lever may extend rearwardly with an upright attached thereto and penetrating the rear and flanged wall portion of the fixture through a slot thereof for purposes of opening and closing the valve.

Concentric rib 9 of the cut-off plate aids in the prevention of leakage of water through the surface plane of the cut-off plate and the under surface of annular plate 3 to the outer wall of element 7. These bearing surfaces and the bearing surface between spindle 12 and central aperture 10 may be oiled or greased for the usual reasons.

It is preferable that all the elements of the valve fitting of my invention be of brass or other noncorrosive and enduring metal. Annular plate 3 and element 7 of the valve proper at the plate portion are of substantial thickness; so that in the event of foreign and solid matter penetrating the surface plane, the same will be ground to a powder by the shearing force of the partial revolutions of element 7. Of course all the other elements of the fitting corresponds in sturdiness to the functions played by each. If the valve proper should cease to function for any reason, lever 18 is disengaged, the strainer disc 16 is unscrewed from the seat of the surface flange of casing 1 and the integral valve portion proper is disengaged from the casing ready for any repair or replacing.

I wish it understood that the embodiment of my invention is solely for purposes of disclosure, there being no limitations to any specific construction; minor changes in size, shape and arrangements of parts, minor variations and modifications of details may all be resorted to without departing from the spirit of my invention nor enlarging its scope within the appended claims.

Having described my invention, what I now claim as new and desire to secure by Letters Patent of the United States is:

1. In combination with a casing for a valve fitting, the said casing comprising concentric walls of differential radii from the central and vertical axis, the upper wall having an outwardly turned concentric flange at the top with a concentric rest on the inner edge of the said flange to serve as a seat for a strainer, a lower wall reduced to a nipple for connection to the drain pipe of the fixture, a horizontal slot on the lower wall: a valve mechanism affixed to and telescoping with the interior of the said casing at a concentric seat between the upper and lower concentric walls of the casing, external means to open and close the valve mechanism.

2. In combination with a casing for a valve fitting, the said casing being provided with a horizontal slot in spaced relation thereto: an annular plate with a plurality of radially disposed openings, the underside of the said plate containng a concentric groove spaced beyond the extreme limit of the said openings, a cut-off plate developing tubularly downwardly, of lesser diameter than the annular plate and concentrically disposed therebeneath, being provided with a plurality of radially disposed openings to register with or obstruct the openings of the annular plate, the cut-off plate being provided at its upper surface with a concentric rib to engage with the aforementioned groove, while the undersurface thereof is provided with an internally threaded burr, adjustable means to concentrically connect cut-off plate to the annular plate and to afford a central spindle therefor, and external means to partially rotate the cut-off plate, all substantially as described.

In testimony whereof, I have hereunto affixed my hand this 8th day of April, 1930 at 1440 Broadway, in the city, county and State of New York.

BERNARD LUTSKY.